United States Patent
Ramakrishnan et al.

(10) Patent No.: US 8,634,390 B2
(45) Date of Patent: Jan. 21, 2014

(54) SYSTEMS AND METHODS FOR WIRELESS LOCAL AREA NETWORK BASED CONTROL OF A SET-TOP BOX DEVICE

(75) Inventors: Raju Ramakrishnan, Bangalore (IN); Peter Joseph, Pathanamthitta (IN); Sampath Raman, Tirunelveli (IN); Balamuralidhar Maddali, Chennai (IN); Ruchir Rodrigues, Dallas, TX (US); Ashish Phutela, Panipat (IN); Shafiq Kassam, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 357 days.

(21) Appl. No.: 12/578,911

(22) Filed: Oct. 14, 2009

(65) Prior Publication Data

US 2011/0085526 A1    Apr. 14, 2011

(51) Int. Cl.
*H04W 4/00*    (2009.01)
*G06F 15/16*    (2006.01)
*G06F 15/177*    (2006.01)
*G06F 15/173*    (2006.01)
*H04N 7/16*    (2011.01)
*G06F 7/04*    (2006.01)

(52) U.S. Cl.
USPC ........... 370/338; 709/217; 709/220; 709/225; 709/227; 725/139; 725/151; 726/2; 726/3; 726/4; 726/6

(58) Field of Classification Search
USPC ........................................................ 370/338
See application file for complete search history.

(56) References Cited

U.S. PATENT DOCUMENTS

| | | | | |
|---|---|---|---|---|
| 8,042,155 | B1 * | 10/2011 | Chang et al. | 726/3 |
| 2005/0239399 | A1 * | 10/2005 | Karabinis | 455/3.02 |
| 2008/0056216 | A1 * | 3/2008 | Zimmerman et al. | 370/338 |
| 2009/0052870 | A1 * | 2/2009 | Marsh et al. | 386/124 |
| 2009/0298535 | A1 * | 12/2009 | Klein et al. | 455/556.1 |
| 2009/0319894 | A1 * | 12/2009 | Markiewicz et al. | 715/702 |
| 2010/0083338 | A1 * | 4/2010 | Chiang | 725/139 |

* cited by examiner

*Primary Examiner* — Noel Beharry

(57) ABSTRACT

An exemplary method includes establishing, by a mobile phone device, a wireless local area network communication channel between the mobile phone device and a set-top box device, providing, by the mobile phone device, a graphical user interface for display on a display screen of the mobile phone device, the graphical user interface configured to facilitate inputting of one or more control commands by a user of the mobile phone device, and controlling, by the mobile phone device, at least one operation of the set-top box device via the wireless local area network communication channel in accordance with the one or more control commands. Corresponding methods and systems are also described.

22 Claims, 14 Drawing Sheets

US 8,634,390 B2

SYSTEMS AND METHODS FOR WIRELESS LOCAL AREA NETWORK BASED CONTROL OF A SET-TOP BOX DEVICE

BACKGROUND INFORMATION

Set-top box devices have provided users of such devices with access to a large number and variety of media content programs and services. For example, a user may choose to experience a variety of broadcast television programs, pay-per-view services, video-on-demand programming, and audio programming via a set-top box.

The large number of media content choices offered by providers can make it difficult for a user of a set-top box device to find and select desired media content. On-screen program guides have alleviated this problem to some degree. However, an on-screen program guide occupies at least a portion of a display screen associated with the set-top box and thereby impairs a user's ability to view a full rendition of a media content instance on the display screen while navigating through the program guide.

Moreover, it is often cumbersome for a user to control how a set-top box operates. For example, a traditional remote control device configured to control a set-top box often includes a plethora of buttons, some of which are never utilized by the user. Hence, it is often difficult for a user to locate and select a sequence of buttons that may be required to perform a particular set-top box device operation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and method for wireless local area network based control of a set-top box device are described herein. As described in more detail below, a mobile phone device may be selectively and communicatively coupled to a set-top box device. The mobile phone device is configured to display a graphical user interface that is configured to facilitate inputting of one or more control commands by a user of the mobile phone device, establish a wireless local area network communication channel with the set-top box device, and control at least one operation of the set-top box device via the wireless local area network communication channel and in accordance with the one or more control commands.

As will be described in more detail below, the systems and methods described herein may facilitate an efficient, secure, and customizable set-top box device control experience for a user. For example, a user may easily navigate through a program guide graphical user interface displayed on a display screen of a mobile phone device without having to display the program guide on a television or other display device associated with a set-top box device. In this manner, the user may view a full screen rendition of a particular media content instance being presented by the set-top box device (e.g., on a television display) and at the same time use the program guide graphical user interface displayed by the mobile phone device to browse through a listing of various other media content instances available via the set-top box device. Additional advantages of the systems and methods described herein are described in more detail below.

As used herein, "media content" may refer generally to any content accessible via a set-top box device. The term "media content instance" will be used herein to refer to any television program, on-demand media program, pay-per-view media program, broadcast media program (e.g., broadcast television program), IPTV media content, advertisement (e.g., commercial), video, movie, song, video game, image, photograph, sound, or any segment, component, or combination of these or other forms of media content that may be viewed or otherwise experienced by a user.

Figure 1:
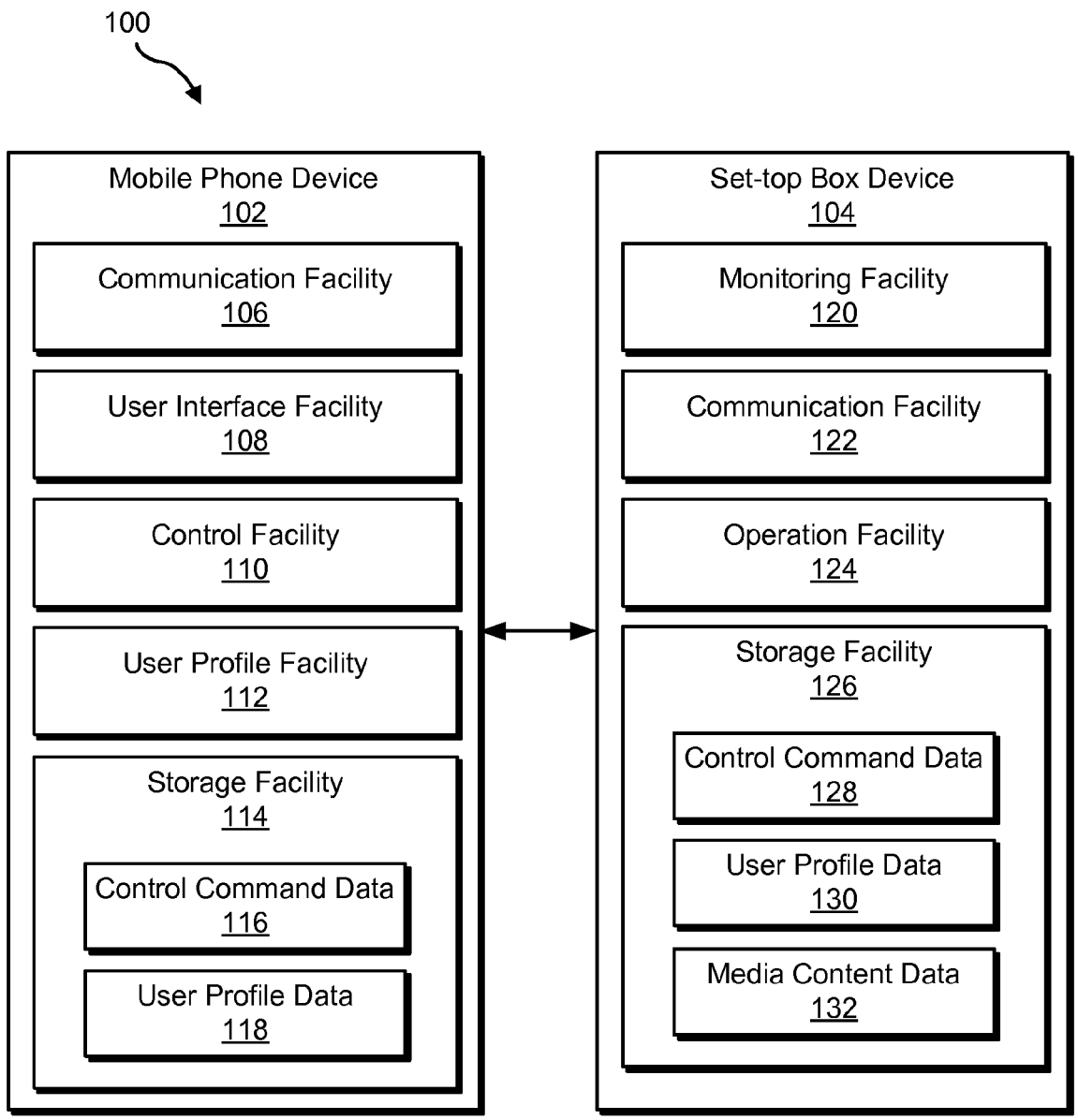
FIG. 1 illustrates an exemplary set-top box control system according to principles described herein.

FIG. 1 illustrates an exemplary set-top box control system 100 (or simply "system 100"). While an exemplary system 100 is shown in FIG. 1, the components and configuration of system 100 illustrated in FIG. 1 are not intended to be limiting. Additional or alternative components and/or configurations may be used in other embodiments. In certain alternative embodiments, for example, one or more of the components shown in FIG. 1 may be omitted or combined.

System 100 may include, but is not limited to, a mobile phone device 102 selectively and communicatively coupled to a set-top box device 104. As will be described in more detail below, mobile phone device 102 may be configured to control one or more operations of set-top box device 104 via a wireless local area network (e.g., a Wi-Fi network).

As shown in FIG. 1, mobile phone device 102 may include a communication facility 106, a user interface facility 108, a control facility 110, a user profile facility 112, and a storage facility 114, which may be in communication with one another using any suitable communication technologies. It will be recognized that although facilities 106-114 are shown to be separate facilities in FIG. 1, any of those facilities may be combined into a single facility as may serve a particular application.

Communication facility 106 may be configured to facilitate communication between mobile phone device 102 and set-top box device 104. For example, communication facility 106 may be configured to transmit and/or receive communication signals and/or data to/from set-top box device 104 via a wireless network device (e.g., a local wireless network router such as a Wi-Fi enabled router). To this end, as will be described in more detail below, communication facility 106 may establish a wireless local area network communication channel between mobile phone device 102 and set-top box device 104. Any suitable communication technologies, including any of the communication technologies mentioned herein, may be employed by communication facility 106 to communicate with set-top box device 104.

User interface facility 108 may be configured to provide one or more user interfaces configured to facilitate user interaction with system 100. For example, user interface facility 108 may provide a user interface through which one or more functions, options, features, and/or tools may be provided to a user and through which user input may be received. In certain embodiments, user interface facility 108 may be configured to provide a graphical user interface ("GUI") for display on a display screen of mobile phone device 102. The graphical user interface may be configured to facilitate inputting of one or more control commands by a user of mobile phone device 102. For example, user interface facility 108 may be configured to detect one or more touch gestures performed by a user of mobile phone device 102. Exemplary touch gestures will be described in more detail below. The one or more control commands may be used by mobile phone device 102 to control at least one operation of set-top box device 104.

Control facility 110 may be configured to control at least one operation of set-top box device 104 in accordance with one or more control commands as input by a user of mobile phone device 102. In some examples, control facility 110 may control at least one operation of set-top box device 104 by directing communication facility 106 to transmit the one or more control commands to set-top box device 104 via a wireless local area network communication channel established by communication facility 106.

User profile facility 112 may be configured to maintain a user profile associated with a user of mobile phone device 102. The user profile may represent one or more personal traits and/or preferences associated with the user, how the user interacts with the set-top box device 104, and/or any other information associated with the user as may serve a particular application. As will be described in more detail below, user profile facility 112 may facilitate control of set-top box device 104 in accordance with a user profile associated with a user of mobile phone device 102.

Storage facility 114 may be configured to maintain control command data 116 representative of one or more control commands input by a user of mobile phone device 102 and user profile data 118 representative of a user profile associated with a user of mobile phone device 102. It will be recognized that storage facility 114 may maintain additional or alternative data as may serve a particular application.

As shown in FIG. 1, set-top box device 104 may include a monitoring facility 120, a communication facility 122, an operation facility 124, and a storage facility 126, which may be in communication with one another using any suitable communication technologies. It will be recognized that although facilities 120-126 are shown to be separate facilities in FIG. 1, any of those facilities may be combined into a single facility as may serve a particular application.

Monitoring facility 120 may be configured to monitor for and detect a communication signal broadcast by mobile phone device 102. As will be described in more detail below, the communication signal may be configured to initiate establishment of a wireless local area network communication channel between mobile phone device 102 and set-top box device 104.

Communication facility 122 may be configured to facilitate communication between set-top box device 104 and mobile phone device 102. For example, communication facility 122 may be configured to transmit and/or receive communication signals and/or data to/from mobile phone device 102 via a wireless network device (e.g., a local wireless network router such as a Wi-Fi enabled router). To this end, as will be described in more detail below, communication facility 122 may operate in conjunction with communication facility 106 of mobile phone device 102 to establish a wireless local area network communication channel between mobile phone device 102 and set-top box device 104. In some examples, establishment of the wireless local area network communication channel may be initiated upon detection by monitoring facility 120 of the communication signal broadcast by mobile phone device 102. Any suitable communication technologies, including any of the communication technologies mentioned herein, may be employed by communication facility 122 to communicate with mobile phone device 102.

Operation facility 124 may be configured to perform one or more operations associated with set-top box device 104. Exemplary operations that may be performed by operation facility 124 include, but are not limited to, displaying a particular media content instance, changing a media content channel, fast forwarding through media content, rewinding or going back within media content, adjusting (e.g., increasing, decreasing, or muting) a volume level associated with media content, scheduling a recording of media content, purchasing "on-demand" media content, flagging media content as a "favorite" or as something that the user dislikes, rating media content, selecting one or more options available within a program guide or other menu structure, powering set-top box device 104 on or off, and/or any other operation associated with set-top box device 104 as may serve a particular application. In some examples, operation facility 124 may perform at least one operation in accordance with one or more control commands input by a user of mobile phone device 102.

Storage facility 126 may be configured to maintain control command data 128 representative of one or more control commands transmitted from mobile phone device 102 to set-top box device 104, user profile data 130 representative of one or more user profiles associated with one or more users of set-top box device 104, and media content data 132 representative of media content accessible via set-top box device 104. It will be recognized that storage facility 126 may maintain additional or alternative data as may serve a particular application.

System 100, including facilities 106-114 and 120-126, may include and/or be implemented by any computer hardware and/or computer-implemented instructions (e.g., software), or combinations of computer-implemented instructions and hardware, configured to perform one or more of the processes described herein. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Common forms of computer-readable media include, for example, a floppy disk, flexible disk, hard disk, magnetic tape, any other magnetic medium, a CD-ROM, DVD, any other optical medium, a RAM, a DRAM a PROM, an EPROM, a FLASH-EEPROM, any other memory chip or cartridge, or any other medium from which a computer can read.

Figure 2:
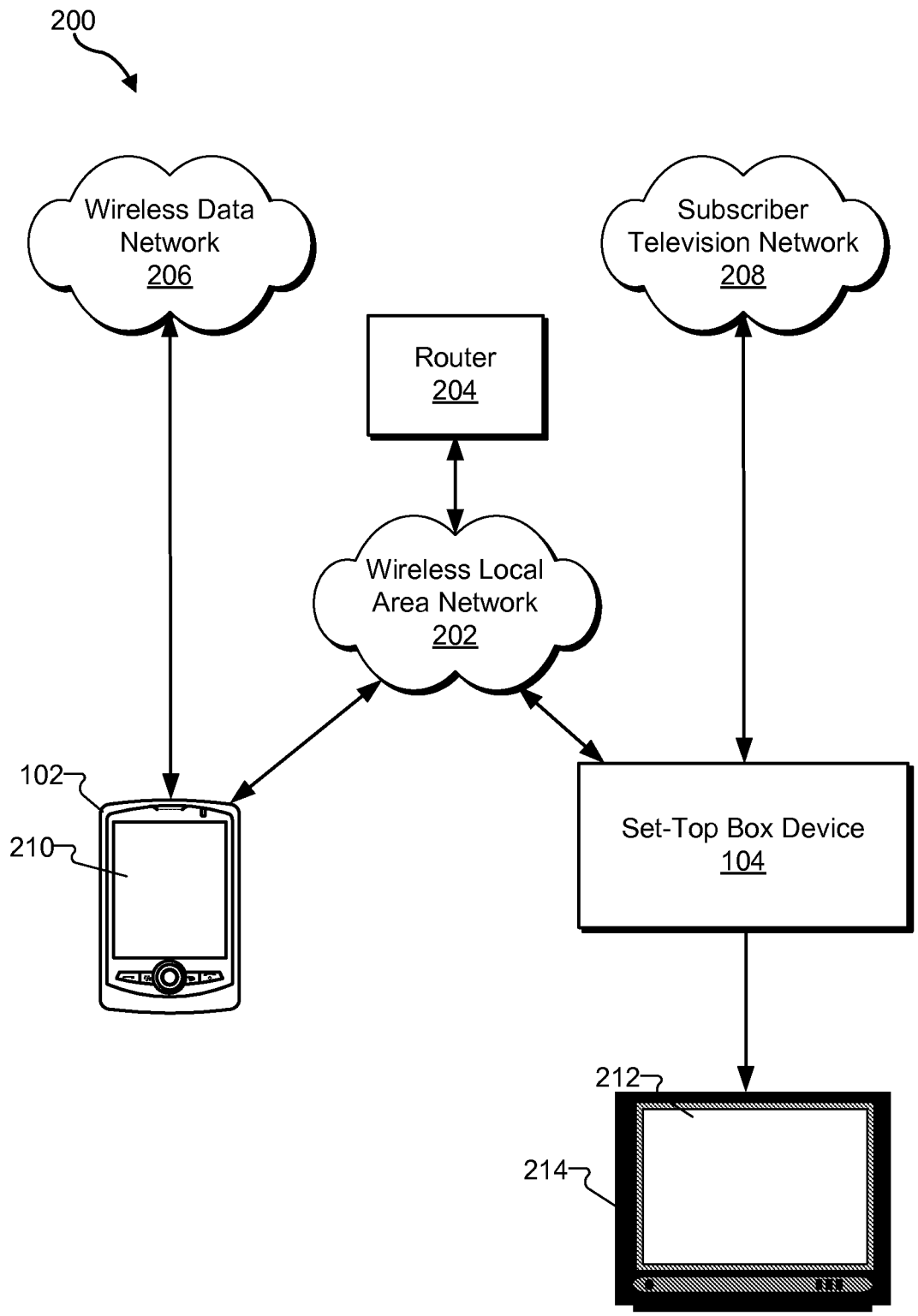
FIG. 2 illustrates an exemplary implementation of the system of FIG. 1 according to principles described herein.

As mentioned, mobile phone device 102 and set-top box device 104 may be configured to communicate one with another by way of a wireless local area network. For example, FIG. 2 illustrates an exemplary implementation 200 of system 100 wherein mobile phone device 102 and set-top box device 104 are communicatively coupled via a wireless local area network 202. For example, mobile phone device 102 and set-top box device 104 may communicate by way of a router 204, which in certain embodiments may include a Wi-Fi router within a local Wi-Fi network (e.g., a home Wi-Fi network). Router 204 may alternatively include any other type of wireless local area network router as may serve a particular application. Mobile phone device 102 may be communicatively coupled to router 204 by way of a wireless connection. Set-top box device 104 may be communicatively coupled to router 204 by way of a wired and/or a wireless connection.

As shown in FIG. 2, mobile phone device 102 may be further configured to communicate with one or more other computing devices (e.g., one or more other mobile phone devices, servers, etc.) by way of wireless data network 206. Likewise, set-top box device 104 may be further configured to communicate with one or more other computing devices by way of a subscriber television network 208, including requesting and/or receiving data representative of media content (e.g., broadcast, multicast, narrowcast, and/or on-demand media content) and/or other data content over subscriber television network 208.

As shown in FIG. 2, display screens may be associated with mobile phone device 102 and set-top box device 104. For example, display screen 210 may be a part of or otherwise associated with mobile phone device 102 and display screen 212 may be associated with set-top box device 104. Display screen 212 may be a part of a display device 214 (e.g., a television) connected to set-top box device 104, for example. Media content and/or one or more graphical user interfaces may be displayed on one or more of display screens 210 and 212, as will be described in more detail below.

In some examples, display screen 210 of mobile phone device 102 may be configured to sense object touches on display screen 210. Such object touches may include, for example, one or more finger touches (e.g., finger taps or presses) and/or one or more "touch gestures" performed by one or more fingers of a user of mobile phone device 102. As used herein, a "touch gesture" refers to any movement of a finger or other object (e.g., a stylus) associated with the user while the finger or object is touching display screen 210. For example, a touch gesture may include a movement of a finger along a surface of display screen 210 in a particular direction. Such movement may be performed by a user to input one or more control commands. For example, as will be described in more detail below, a user may perform one or more touch gestures to scroll within a graphical user interface displayed on display screen 210, direct set-top box device 104 to present a media content instance stored on mobile phone device 102, and/or input any other control command as may serve a particular application.

Figure 3:
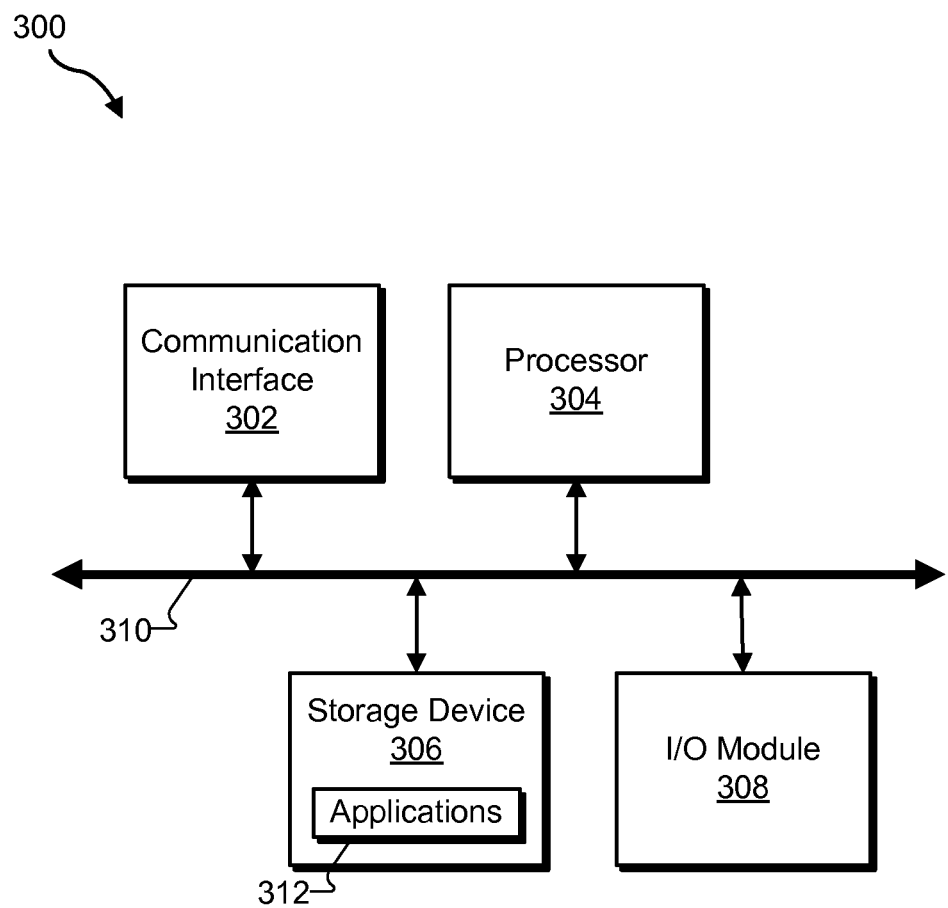
FIG. 3 illustrates exemplary components of a computing device that may implement one or more facilities of a mobile phone device according to principles described herein.

FIG. 3 illustrates exemplary components of a computing device 300 that may implement one or more of the facilities 106-114 of mobile phone device 102. As shown in FIG. 3, computing device 300 may include a communication interface 302, a processor 304, a storage device 306, and an I/O module 308 communicatively connected to one another via a communication infrastructure 310. While an exemplary computing device 300 is shown in FIG. 3, the components illustrated in FIG. 3 are not intended to be limiting. Additional or alternative components may be used in other embodiments. Components of computing device 300 shown in FIG. 3 will now be described in additional detail.

Communication interface 302 may be configured to communicate with one or more computing devices. In particular, communication interface 302 may be configured to transmit and/or receive one or more messages, encryption configuration data, communication signals, and/or other data. Examples of communication interface 302 include, without limitation, a wireless network interface, a modem, and any other suitable interface. Communication interface 302 may be configured to interface with any suitable communication media, protocols, and formats.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 312 or other computer-executable instructions such as may be stored in storage device 306 or another computer-readable medium.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 312 (which may include, but are not limited to, one or more software applications) configured to direct processor 304 to perform any of the operations described herein may be stored within storage device 306. In some examples, data may be arranged in one or more databases residing within storage device 306.

I/O module 308 may be configured to receive user input and provide user output and may include any hardware, firmware, software, or combination thereof supportive of input and output capabilities. For example, I/O module 308 may include hardware and/or software for capturing user input, including, but not limited to, speech recognition hardware and/or software, a keyboard or keypad, a touch screen component (e.g., touch screen display), a receiver (e.g., an RF or infrared receiver), and/or one or more input buttons.

I/O module 308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 308 is configured to provide graphical data to a display for presentation to a user. The graphical data may be representative of one or more graphical user interfaces and/or any other view as may serve a particular application.

In some examples, any of facilities 106-114 may be implemented by or within one or more components of computing device 300. For example, one or more applications 312 residing within storage device 306 may be configured to direct processor 304 to perform one or more processes or functions associated with communication facility 106, user interface facility 108, control facility 110, and/or user profile facility 112. Likewise, storage facility 114 may be implemented by or within storage device 306.

Figure 4:
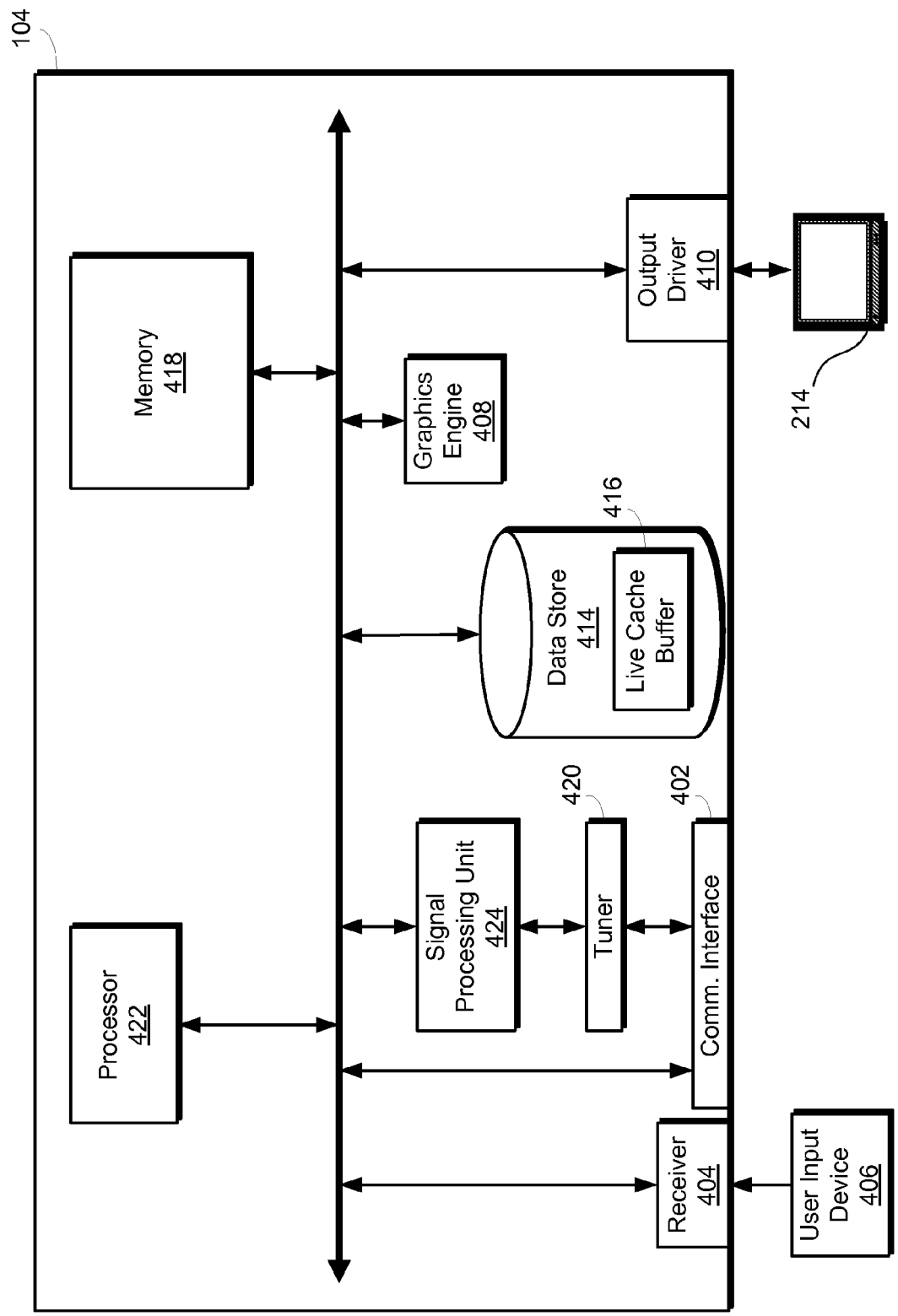
FIG. 4 illustrates an exemplary implementation of a set-top box device according to principles described herein.

FIG. 4 illustrates an exemplary implementation of set-top box device 104. Various components are shown to be included within set-top box device 104 for illustrative purposes only. It will be recognized that set-top box device 104 may include additional or alternative components as may serve a particular application.

As shown in FIG. 4, set-top box device 104 may include a communication interface 402, which may be configured to receive media content and/or other data (e.g., media content metadata, program guide data, display data, etc.) in any acceptable format by way of subscriber television network 208. Communication interface 402 may include any device, logic, and/or other technologies suitable for receiving signals, media content, and/or data. Communication interface 402 may be configured to interface with any suitable communication media, protocols, and formats, including any of those mentioned herein.

Set-top box device 104 may also include a receiver 404 configured to receive user input signals from a user input device 406. User input device 406 may include, for example, a remote control device or any other suitable input device and may be configured to communicate with receiver 404 via a wireless link, electrical connection, or any other suitable communication link.

Set-top box device 104 may include a graphics engine 408 and an output driver 410. Graphics engine 408 may be configured to generate graphics to be provided to output driver 410, which may be configured to interface with or drive display device 214. Output driver 410 may provide output signals to display 214, the output signals including graphical data (e.g., graphical data representative of media content and/or a graphical user interface) generated by graphics engine 408 and to be presented by display device 214 for experiencing by a user. Graphics engine 408 and output driver 410 may include any combination of hardware, software, and/or firmware as may serve a particular application.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Electronic data, including data disclosed herein, may be temporarily and/or permanently stored in data store 414. Data store 414 is shown to be included within set-top box device 104 in FIG. 4 for illustrative purposes only. It will be understood that data store 414 may additionally or alternatively be located external to set-top box device 104.

Data store 414 may include one or more live cache buffers 416. Live cache buffer 416 may additionally or alternatively reside in memory 418 or in a storage device external to set-top box device 104. In some examples, media content data may be temporarily stored in live cache buffer 416 to facilitate viewing and/or recording of the media content.

Set-top box device 104 may include memory 418. Memory 418 may include, but is not limited to, FLASH memory, random access memory ("RAM"), dynamic RAM ("DRAM"), other suitable computer-readable media, or any combination or sub-combination thereof. In some examples, data representative of one or more applications configured to run on or otherwise be executed by set-top box device 104 may reside in memory 418. For example, data representative of one or more executable applications residing in memory 418 (which may include, but are not limited to, one or more software applications) may be configured to direct processor 422 to perform any of the operations described herein that are associated with set-top box device 104.

Set-top box device 104 may include one or more tuners 420. Tuner 420 may be configured to selectively receive media content carried on a particular media content carrier channel such that the media content may be processed by set-top box device 104. In some examples, media content received by tuner 420 may be temporarily buffered, or stored, in the live cache buffer 416. If there are multiple tuners 420, there may be a live cache buffer 416 corresponding to each of the tuners 420.

While tuner 420 may be used to receive certain media content carrying signals transmitted over subscriber television network 208, set-top box device 104 may be configured to receive other types of media content signals (including media content signals and/or program guide data signals) without using a tuner. For example, digital streams of data packets (e.g., IP-based data packets) may be received without using a tuner. For such types of media content signals, communication interface 402 may receive and forward the signals directly to other components of set-top box device 104 (e.g., processor 422 or signal processing unit 424, described in more detail below) without the signals going through tuner 420. For an IP-based signal, for example, signal processing unit 424 may function as an IP receiver.

In certain embodiments, other data may be received by communication interface 402 and forwarded to one or more components of set-top box device 104 without going through tuner 420. For example, communication interface 402 may be configured to send and receive data (e.g., display data such as image data representative of a graphical user interface display) by way of an IP backchannel of subscriber television network 208.

Set-top box device 104 may include at least one processor, such as processor 422, configured to control and/or perform one or more operations of set-top box device 104. Set-top box device 104 may also include a signal processing unit 424 configured to process incoming media content. Signal processing unit 424 may be configured, for example, to demodulate and parse encoded digital media content. In some examples, set-top box device 104 may include one or more signal processing units 424 corresponding to each of the tuners 420.

It is often difficult or inconvenient for a user of a set-top box device to navigate through the many different media content choices, menus, program guide views, and other options available via a set-top box device while at the same time viewing or otherwise experiencing a media content instance. To this end, the methods and systems described herein facilitate control of one or more operations of a set-top box device by a mobile phone device configured to communicate with the set-top box device by way of a wireless local area network communication channel.

Figure 5:
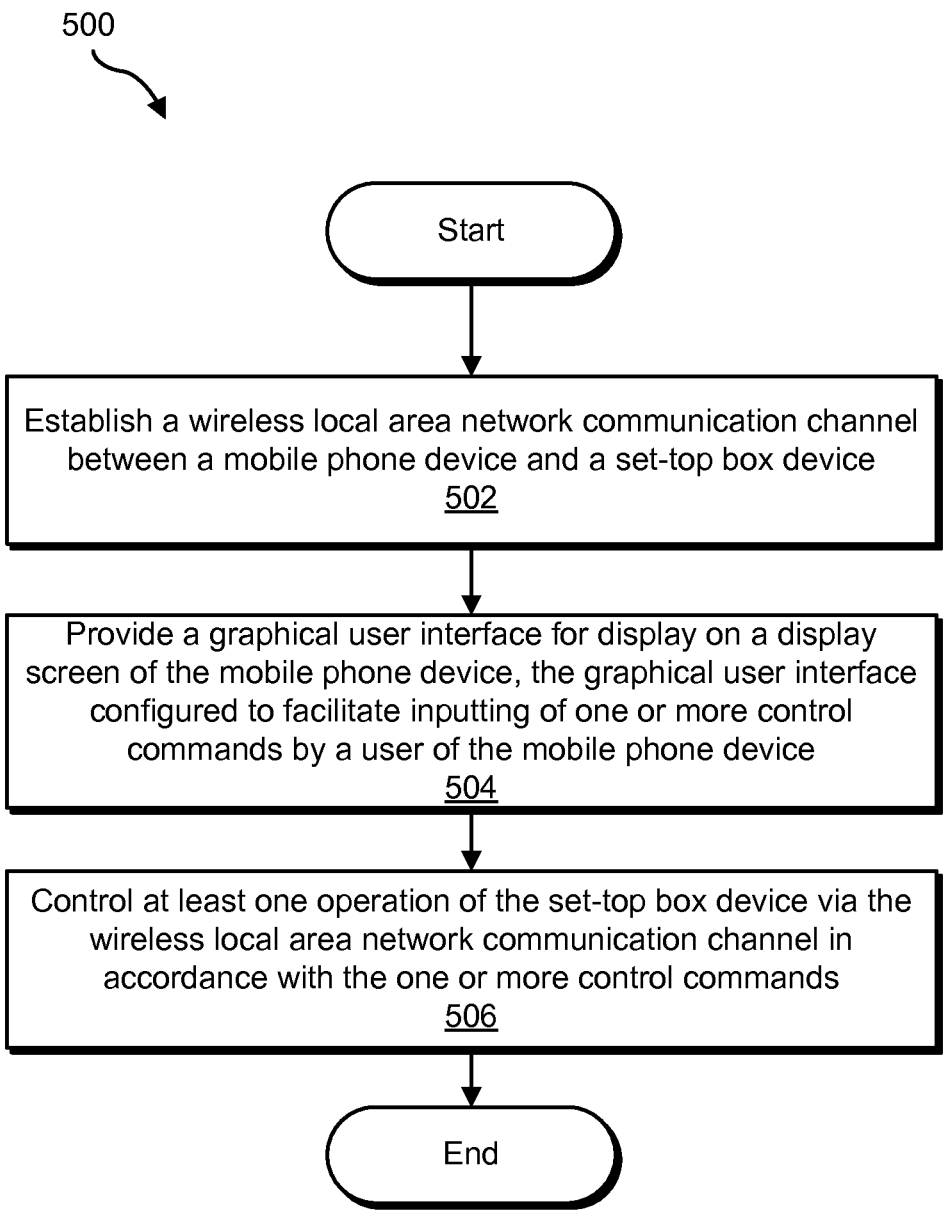
FIG. 5 illustrates an exemplary set-top box control method according to principles described herein.

FIG. 5 illustrates an exemplary set-top box control method 500. As will be described below, method 500 facilitates control of one or more operations of a set-top box device by a mobile phone device configured to communicate with the set-top box device by way of a wireless local area network communication channel. While FIG. 5 illustrates exemplary steps according to one embodiment, other embodiments may omit, add to, reorder, and/or modify any of the steps shown in FIG. 5. The steps shown in FIG. 5 may be performed by mobile phone device 102 and/or any of the facilities 106-114 associated with mobile phone device 102.

Figure 6:
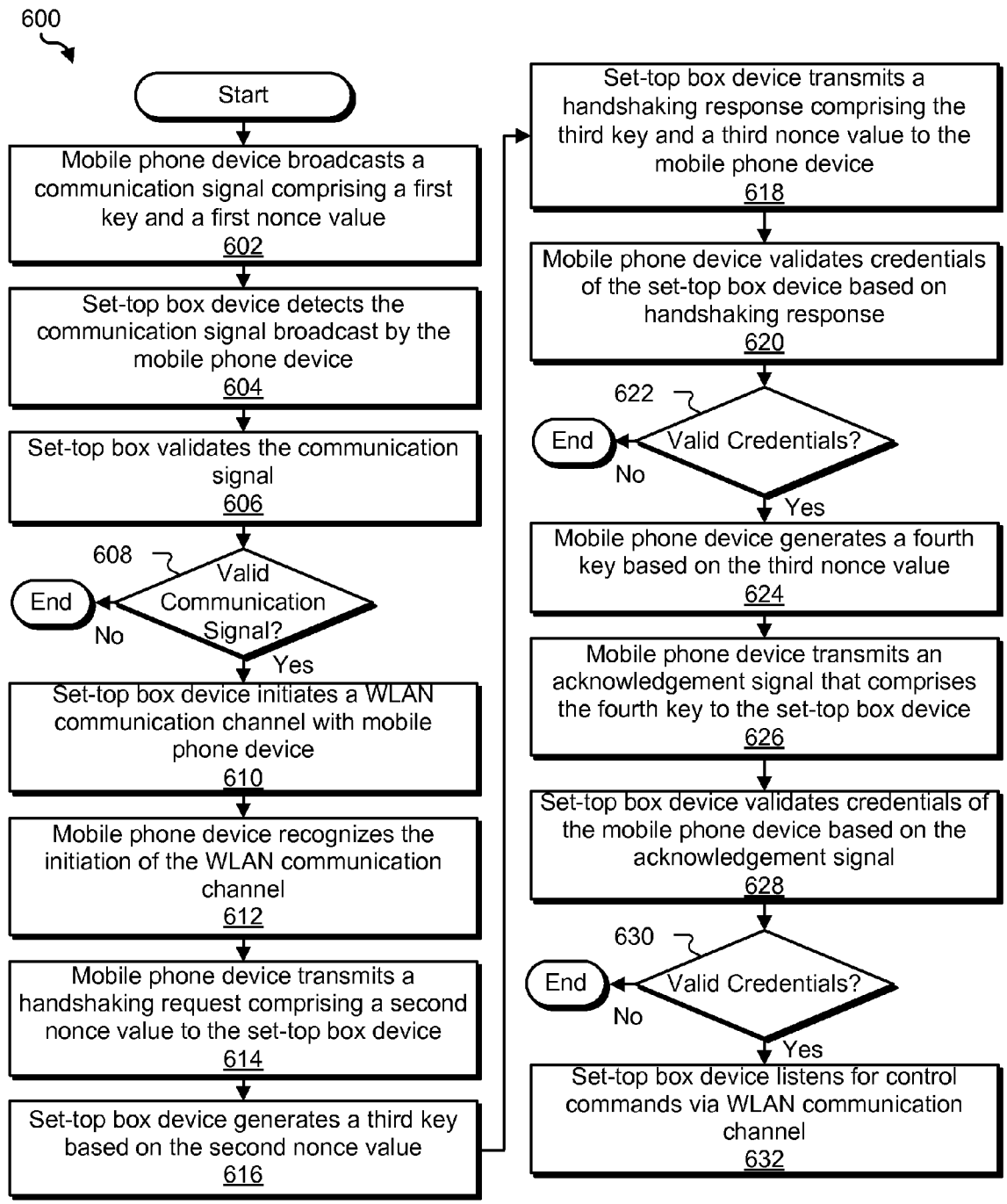
FIG. 6 shows an exemplary method of establishing a wireless local area network communication channel between a mobile phone device and a set-top box device according to principles described herein.

In step 502, a wireless local area network communication channel is established between a mobile phone device and a set-top box device. The wireless local area network communication channel may be established according to any suitable transmission protocol. To illustrate, FIG. 6 shows an exemplary method of establishing a wireless local area network communication channel between mobile phone device 102 and set-top box device 104. The method illustrated in connection with FIG. 6 may be used to ensure session and data security during transmission of data between mobile phone device 102 and set-top box device 104. While FIG. 6 illustrates exemplary steps according to one embodiment, other embodiments may omit, add to, reorder, and/or modify any of the steps shown in FIG. 6. Various steps illustrated in FIG. 6 may be performed by mobile phone device 102 (or by facilities thereof) while other steps illustrated in FIG. 6 may be performed by set-top box device 104 (or by facilities thereof).

In step 602, mobile phone device 102 broadcasts a communication signal. The communication signal may be broadcast by mobile phone device 102 in any suitable manner (e.g., in the form of one or more wirelessly transmitted broadcast packets) and may include data representative of a key (referred to herein as a "first key") and a nonce value (referred to herein as a "first nonce value"). The nonce value may include any sequence of characters as may serve a particular application. For example, the nonce value may include a random or pseudo-random number, a timestamp generated during the broadcast of the communication signal, and/or any other sequence of characters as may serve a particular application.

The key included within the communication signal may be generated by mobile phone device 102 using a combination of the nonce value, a user ID assigned to mobile phone device 102, and a password assigned to mobile phone device 102. For example, if the user ID is "51234567890", the password is "ABCD", and the nonce value is "987654321", the combined string "51234567890ABCD987654321" may be formed and used as an input to generate the key. As will be described in more detail below, the same user ID and password are assigned to set-top box device 104 so that both mobile phone device 102 and set-top box device 104 may have a means of generating identical keys and thereby verify each other's credentials.

In some examples, the communication signal is automatically broadcast by mobile phone device 102 according to a predefined broadcast schedule. For example, mobile phone device 102 may be configured to periodically transmit one or more broadcast packets representative of the communication signal. In this manner, when mobile phone device 102 enters a geographic footprint of a wireless local area network associated with set-top box device 104, a wireless local area network communication channel may be automatically established without requiring action or authorization by a user of mobile phone device 102. Additionally or alternatively, mobile phone device 102 may be configured to broadcast the communication signal at the request of the user (e.g., in response to initiation of a remote control emulation application on mobile phone device 102).

In step 604, set-top box device 104 detects the communication signal broadcast by mobile phone device 102. Set-top box device 104 may be configured to monitor for and detect the communication signal in any suitable manner. For example, set-top box device 104 may be configured to detect a broadcast packet transmitted by mobile phone device 102.

In step 606, set-top box device 104 validates the communication signal. For example, set-top box device 104 may be configured to generate a key (referred to herein as a "second key") based on the nonce value included within the broadcast communication signal. The generation of the second key is further based on the user ID and password assigned to set-top box device 104, which, as described previously, are respectively the same as the user ID and password assigned to mobile phone device 102. After set-top box device 104 generates the second key, set-top box device 104 may compare the first and second keys to determine whether they match one another. Matching keys indicate that the communication signal is valid. In other words, if the first and second keys match, mobile phone device 102 may be authorized to communicate with set-top box device 104. Conversely, if the first and second keys do not match (i.e., they are different one from another), mobile phone device 102 is not authorized to communicate with set-top box device 104 and further communication between mobile phone device 102 and set-top box device 104 may be prevented.

If it is determined that the communication signal is not valid (No; step 608), the remaining steps of establishing a wireless local area network communication channel shown in FIG. 6 are not performed. If it is determined that the communication signal is valid (Yes; step 608), set-top box device 104 initiates a wireless local area network ("WLAN") communication channel with mobile phone device 102, as shown in step 610. The wireless local area network communication channel may include a transmission control protocol ("TCP") communication channel or any other suitable communication channel as may serve a particular application.

In step 612, mobile phone device 102 recognizes the initiation of the wireless local area network communication channel performed in step 610. However, before mobile phone device 102 may control set-top box device 104 via the wireless local area network communication channel, the wireless local area network communication channel is authenticated using the remaining steps illustrated in FIG. 6.

In step 614, mobile phone device 102 transmits a handshaking request to set-top box device 104. The handshaking request is configured to authenticate the wireless local area network communication channel initiated in step 610 and may include a nonce value (referred to herein as a "second nonce value"). As will be described in more detail below, the second nonce value may be used by set-top box device 104 to generate a response to the handshaking request.

In step 616, set-top box device 104 generates a key (referred to herein as a "third key") based on the second nonce value. The generation of the third key is further based on the user ID and password assigned to set-top box device 104. The third key may be generated by set-top box device 104 in any suitable manner as may serve a particular application.

In step 618, set-top box device 104 transmits a handshaking response to mobile phone device 102. The handshaking response includes the third key that was generated by set-top box device 104 and a newly generated nonce value (referred to herein as a "third nonce value").

In step 620, mobile phone device 102 uses the handshaking response to validate credentials of set-top box device 104. For example, mobile phone device 102 may extract the third key from the handshaking response and analyze the key to determine whether it was generated using a valid user id and password (i.e., a user id and password that match the user id and password of mobile phone device 104). If the handshaking response indicates that set-top box device 104 does not have valid credentials (No; step 622), the wireless local area network communication channel is closed. If the handshaking response indicates that set-top box device 104 includes valid credentials (Yes; step 622), mobile phone device 102 generates a key (referred to herein as a "fourth key") based on the third nonce value that was included in the handshaking response, as shown in step 624. The generation of the fourth key is further based on the user ID and password assigned to mobile phone device 102.

In step 626, mobile phone device 102 transmits an acknowledgment signal to set-top box device 104. The acknowledgment signal is configured to acknowledge that mobile phone device 102 has validated the credentials of set-top box device 104. The acknowledgment signal is further configured to include the fourth key generated by mobile phone device 102. In this manner, set-top box device 104 may also validate the credentials of mobile phone device 102.

In step 628, set-top box device 104 validates the credentials of mobile phone device 102 based on the acknowledgment signal. For example, set-top box device 104 may extract the fourth key from the acknowledgment signal and analyze the fourth key to determine whether the fourth key was generated by mobile phone device 102 using a valid user ID and password that match the user ID and password of set-top box device 104.

If it is determined that mobile phone device 102 does not have valid credentials (No; step 630), the wireless local area network communication channel is closed. However, if it is determined that mobile phone device 102 has valid credentials (Yes; step 630), a wireless local area network communication channel has successfully been established between mobile phone device 102 and set-top box device 104. In step 632, set-top box device 104 listens for control commands sent by mobile phone device 102 via the wireless local area network communication channel. In some examples, to ensure that the wireless local area network communication channel remains secure, set-top box device 104 may periodically challenge mobile phone device 102 using a handshaking request similar to that described above. If, at any point within the communication session, either set-top box device 104 or mobile phone device 102 fails to respond to a handshaking request successfully, the wireless local area network communication channel may be closed.

The communication protocol described in connection with FIG. 6 that is used to establish a wireless local area network communication channel may vary as may serve a particular application. For example, set-top box device 104 may be configured to transmit the initial handshaking request instead of the mobile phone device 102.

Returning to FIG. 5, in step 504, a graphical user interface is provided for display on a display screen of the mobile phone device. The graphical user interface is configured to facilitate inputting of one or more control commands by a user of the mobile phone device. As will be described in more detail below, at least one operation of the set-top box device may be controlled in accordance with the one or more control commands.

In step 506, at least one operation of the set-top box device is controlled via the wireless local area network communication channel established in step 502 and in accordance with the one or more control commands input via the graphical user interface provided in step 504.

Exemplary graphical user interfaces that may be provided for display on display screen 210 of mobile phone device 102 and that may facilitate inputting of one or more control commands configured to control at least one operation of set-top box device 104 will now be described. It will be recognized that the various graphical user interfaces and methods of inputting one or more control commands via the graphical user interfaces described herein are merely illustrative of the many different embodiments that may be associated with the systems and methods described herein.

Figure 7:
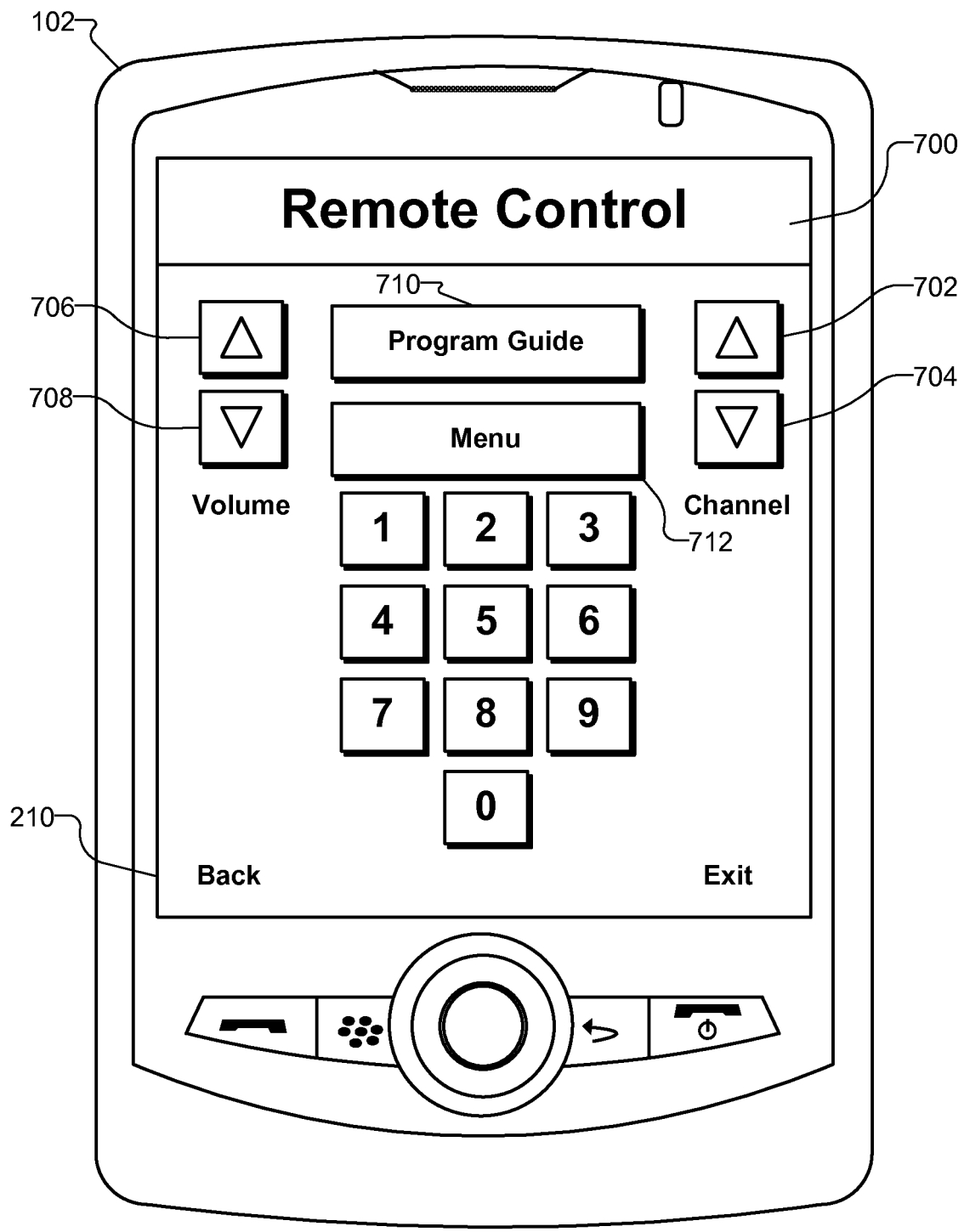
FIG. 7 illustrates an exemplary remote control emulation graphical user interface ("GUI") that may be displayed on a display screen of a mobile phone device according to principles described herein.

FIG. 7 illustrates an exemplary remote control emulation GUI 700 that may be displayed on display screen 210 of mobile phone device 102 and configured to facilitate inputting of one or more control commands by a user. As shown in FIG. 7, remote control emulation GUI 700 may be configured to emulate a remote control device associated with a set-top box device 104. To this end, remote control emulation GUI 700 may include a plurality of graphical objects representative of buttons that may be located on a remote control device. For example, graphical objects 702 and/or 704 may be selected by a user to direct set-top box device 104 to switch from one channel to another. Additionally or alternatively, graphical objects 706 and/or 708 may be selected by a user to adjust a volume level of a media content instance being presented by set-top box device 104. Graphical object 710 may be selected by a user to access a program guide associated with media content available by way of set-top box device 104. Graphical object 712 may be selected by a user to access a menu of options associated with set-top box device 104. It will be recognized that additional or alternative graphical objects representative of other buttons located on a remote control device associated with set-top box device 104 may be displayed within remote control emulation GUI 700 as may serve a particular application.

Selection of any of the graphical objects included within remote control emulation GUI 700 and in the other GUIs described herein may cause control facility 110 of mobile phone device 102 to control a corresponding operation of set-top box device 104. For example, selection of graphical object 702 causes control facility 110 to direct set-top box device 104 to switch to a sequentially higher channel. In some examples, such control may be realized by control facility 110 directing communication facility 106 to transmit a control command indicative of the requested channel change to set-top box device 104 via a wireless local area network communication channel. Operation facility 124 of set-top box device 104 may then perform the requested channel change in accordance with the transmitted control command.

Figure 8:
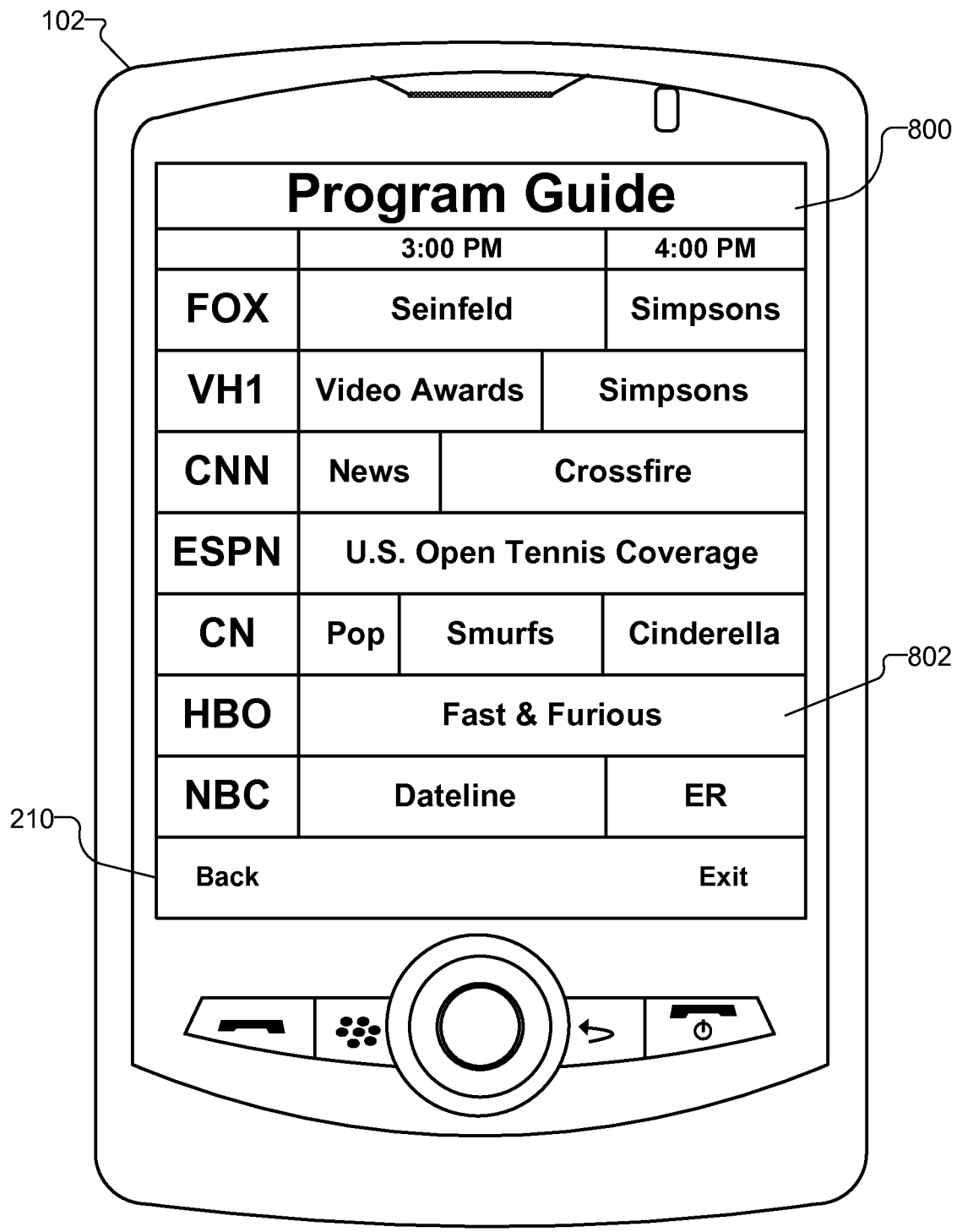
FIG. 8 illustrates an exemplary program guide GUI that may be displayed on a display screen of a mobile phone device according to principles described herein.

FIG. 8 illustrates an exemplary program guide GUI 800 that may be displayed on display screen 210 of mobile phone device 102. In some examples, program guide GUI 800 is displayed in response to a user selection of program guide graphical object 710 shown in FIG. 7. As shown in FIG. 8, program guide GUI 800 may display a listing of media content instances available via the set-top box device 104 during one or more time blocks.

A benefit of displaying program guide GUI 800 on the display screen of mobile phone device 102 is that the user may search through various media content listings within the program guide GUI 800 without having to display the program guide on display device 214 (e.g., a television) associated with set-top box device 104. In this manner, a user may view a full screen rendition of a particular media content instance on display device 214 and at the same time use program guide GUI 800 displayed on display screen 210 of mobile phone device 102 to browse through a listing of various other media content instances available via set-top box device 104.

In some examples, a user of mobile phone device 102 may navigate within program guide GUI 800 by performing one or more touch gestures. To illustrate, the user may swipe his or her finger to the left or right along the surface of display screen 210 to view media content listings associated with time blocks not currently displayed within a particular view of program guide GUI 800. Additionally or alternatively, the user may swipe his or her finger up or down along the surface of display screen 210 to view media content listings associated with channels not currently displayed within a particular view of program guide GUI 800. In yet another example, the user may user two fingers to perform a "pinching" touch gesture in which the two fingers are gradually brought together on the surface of display screen 210 in order to zoom in within program guide GUI 800. Alternatively, the user may user two fingers to perform an "expanding" touch gesture in which the two fingers are gradually separated one from another on the surface of display screen 210 in order to zoom out from a particular view of program guide GUI 800. Touch gesture navigation within program guide GUI 800 may be more efficient, effective, and easy to perform by a user in comparison to traditional navigation techniques associated with program guides that are displayed on display device 214 associated with set-top box device 104.

In some examples, a user may search for a particular media content listing within program guide GUI 800 by inputting one or more characters representative of one or more search terms using a keyboard and/or number pad that is a part of mobile phone device 102. Additionally or alternatively, a user may search for a particular media content listing within program guide GUI 800 by speaking one or more search terms into a microphone or other receiver that is a part of mobile phone device 102. Voice recognition software implemented on mobile phone device 102 may recognize the one or more search terms and direct mobile phone device 102 to display a results list based on the spoken search terms.

In some examples, a user may select one of the media content listings shown in program guide 800 in order to view or otherwise access a media content instance associated with a selected listing. For example, a user may select media content listing 802 in order to direct set-top box device 104 to tune to a channel named "HBO" in order to present a media content instance entitled "Fast & Furious".

Additionally or alternatively, a user may access additional program information corresponding to a media content instance associated with one of the media content listings displayed within program guide GUI 800. For example, a user may desire to view additional program information associated with media content listing 802. To this end, the user may perform one or more touch gestures to view additional program information associated with media content listing 802. For example, the user may press and hold down his or her finger on media content listing 802 until a list of options associated with the selected media content listing 802 is displayed within program guide GUI 800. The user may then select one of the available options to view the additional program information (e.g., by tapping his or her finger on a graphical object representative of the desired option).

Figure 9:
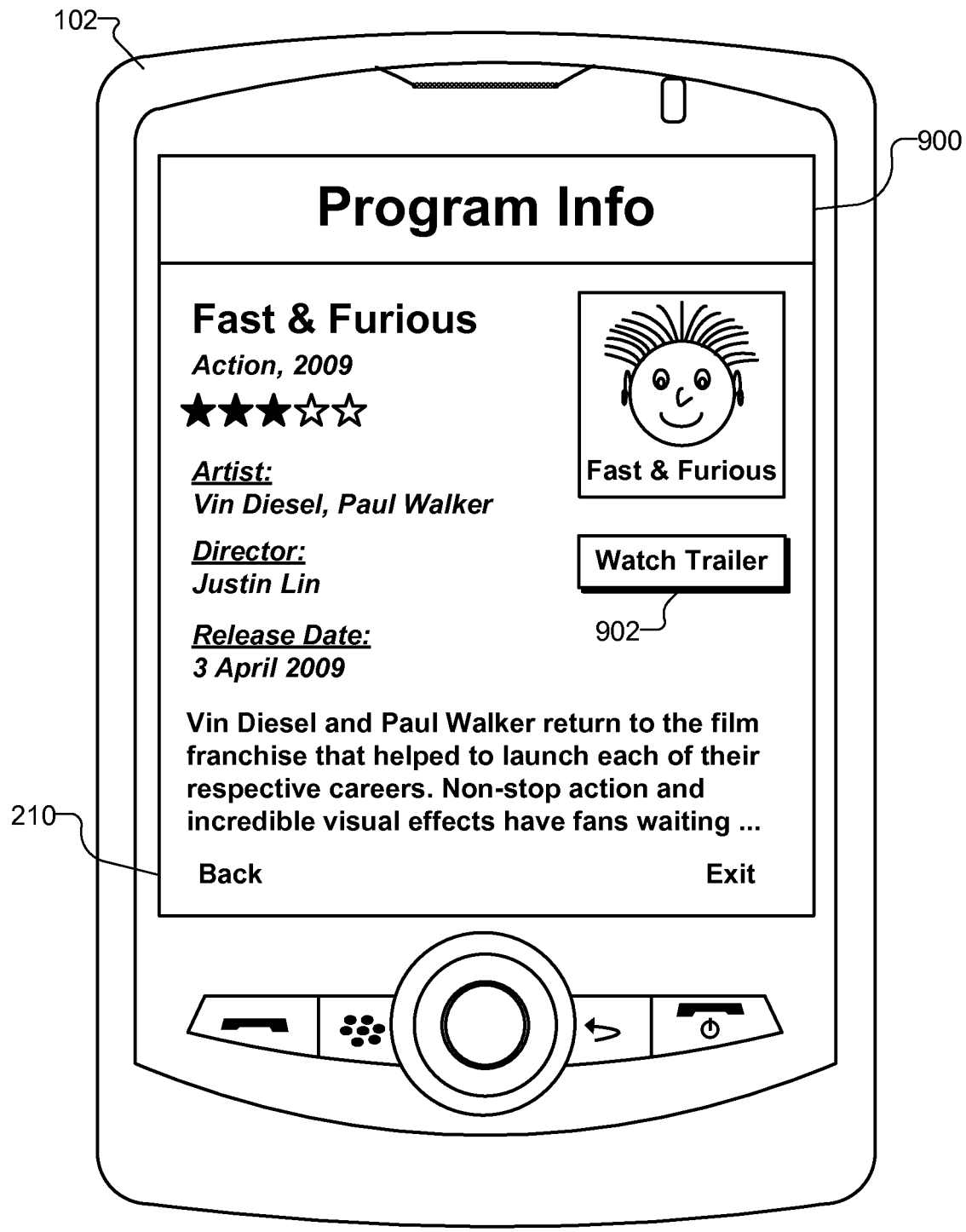
FIG. 9 illustrates an exemplary program information GUI that may be displayed on a display screen of a mobile phone device according to principles described herein.

FIG. 9 illustrates an exemplary program information GUI 900 that may be displayed on display screen 210 of mobile phone device 102 after an option to access program information associated with media content listing 802 is selected. As shown in FIG. 9, information such as, but not limited to, a rating of the media content instance associated with media content listing 802, information related to personnel associated with the media content instance, and a synopsis of the media content instance may be displayed within program information GUI 900.

Additionally or alternatively, an option 902 may be selected in order to view a trailer, commercial, or other preview associated with the media content instance. In some examples, the trailer may be viewed within display screen 210 of mobile phone device 102. In this manner, the user may view the trailer without interrupting a media content instance that is currently being presented by set-top box device 104 on display device 214. Additionally or alternatively, the user may select an option to have the trailer presented by set-top box device 104.

Figure 10:
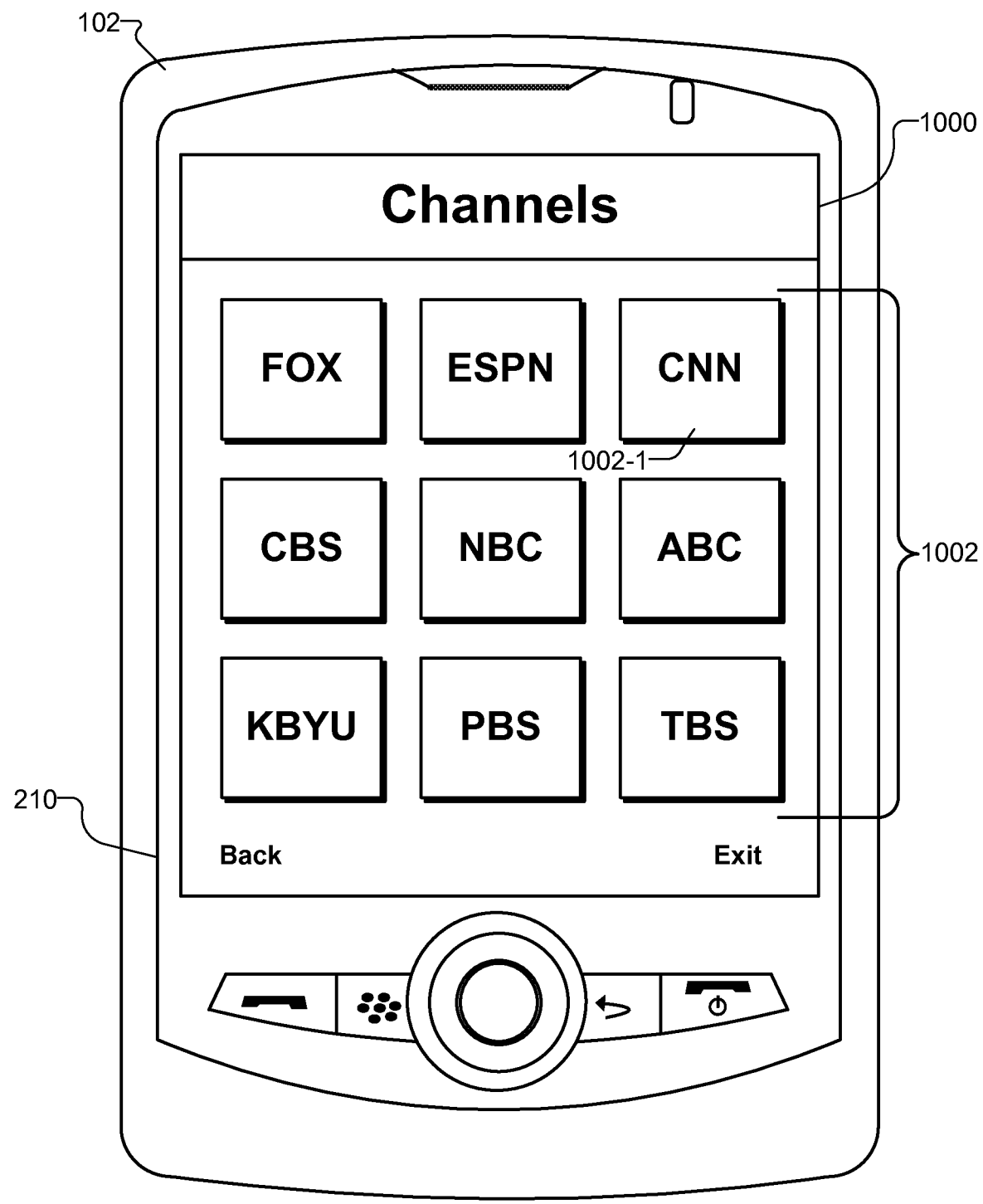
FIG. 10 illustrates a channel grid GUI that may be displayed on a display screen of a mobile phone device according to principles described herein.

FIG. 10 illustrates a channel grid GUI 1000 that may be displayed on display screen 210 of mobile phone device 102 and that may be configured to display one or more graphical objects 1002 representative of one or more corresponding channels available via set-top box device 104. The list of channels displayed within GUI 1000 may be customized by a user to include one or more favorite channels, one or more channels associated with a particular category, and/or any other grouping of channels as may serve a particular application. In some examples, each of the graphical objects 1002 may be selected by a user in order to direct set-top box device 104 to switch to a channel associated with the selected graphical object. For example, a user may select graphical object 1002-1 in order to direct set-top box device 104 to switch to a channel named "CNN".

In some examples, a user may view a program guide GUI associated with a particular channel displayed in channel grid GUI 1000. For example, the user may press and hold his or her finger on graphical object 1002-1 for a predetermined period of time. In response, mobile phone device 102 may display a program guide GUI that includes media content listings available on "CNN".

In some examples, a user may input one or more control commands configured to direct set-top box device 104 to display or otherwise present one or more media content instances stored within mobile phone device 102. For example, a user may have a collection of photographs stored within mobile phone device 102 and a desire to display one or more of the photographs on display device 214 associated with set-top box device 104.

Figure 11:
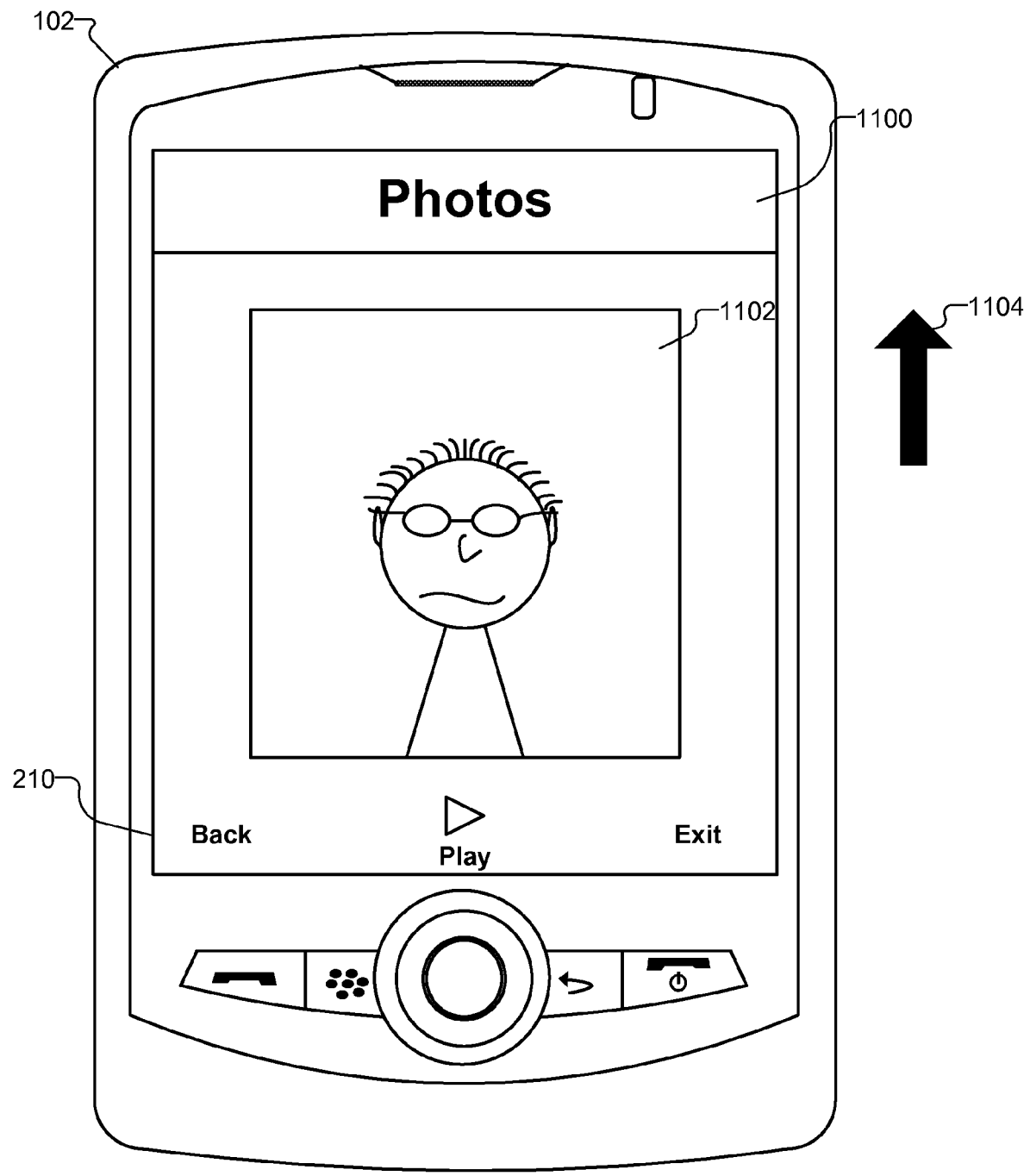
FIG. 11 shows a photograph GUI that may be displayed on a display screen of a mobile phone device according to principles described herein.

To illustrate, FIG. 11 shows a photograph GUI 1100 that may be displayed on display screen 210 of mobile phone device 102 and that may be configured to display one or more photographs (e.g., photograph 1102) therein. To view photograph 1102 on display device 214 associated with set-top box device 104, a user may input a control command configured to direct set-top box device 104 to display photograph 1102 on display device 214. The control command may be input in any suitable manner. For example, the user may perform one or more touch gestures configured to direct set-top box device 104 to display photograph 1102 on display device 214. To illustrate, the user may use his or her finger to "flick" photograph 1102 in a direction indicated by arrow 1104. Control facility 110 may be configured to recognize the flicking motion and direct set-top box device 104 to display photograph 1102 on display device 214 accordingly. It will be recognized that any alternative touch gesture may be used to direct set-top box device 104 to display photograph 1102 on display device 214.

In some examples, a user of mobile phone device 102 may desire to select a help option in order to learn how to perform one or more actions associated with mobile phone device 102

Figure 12:
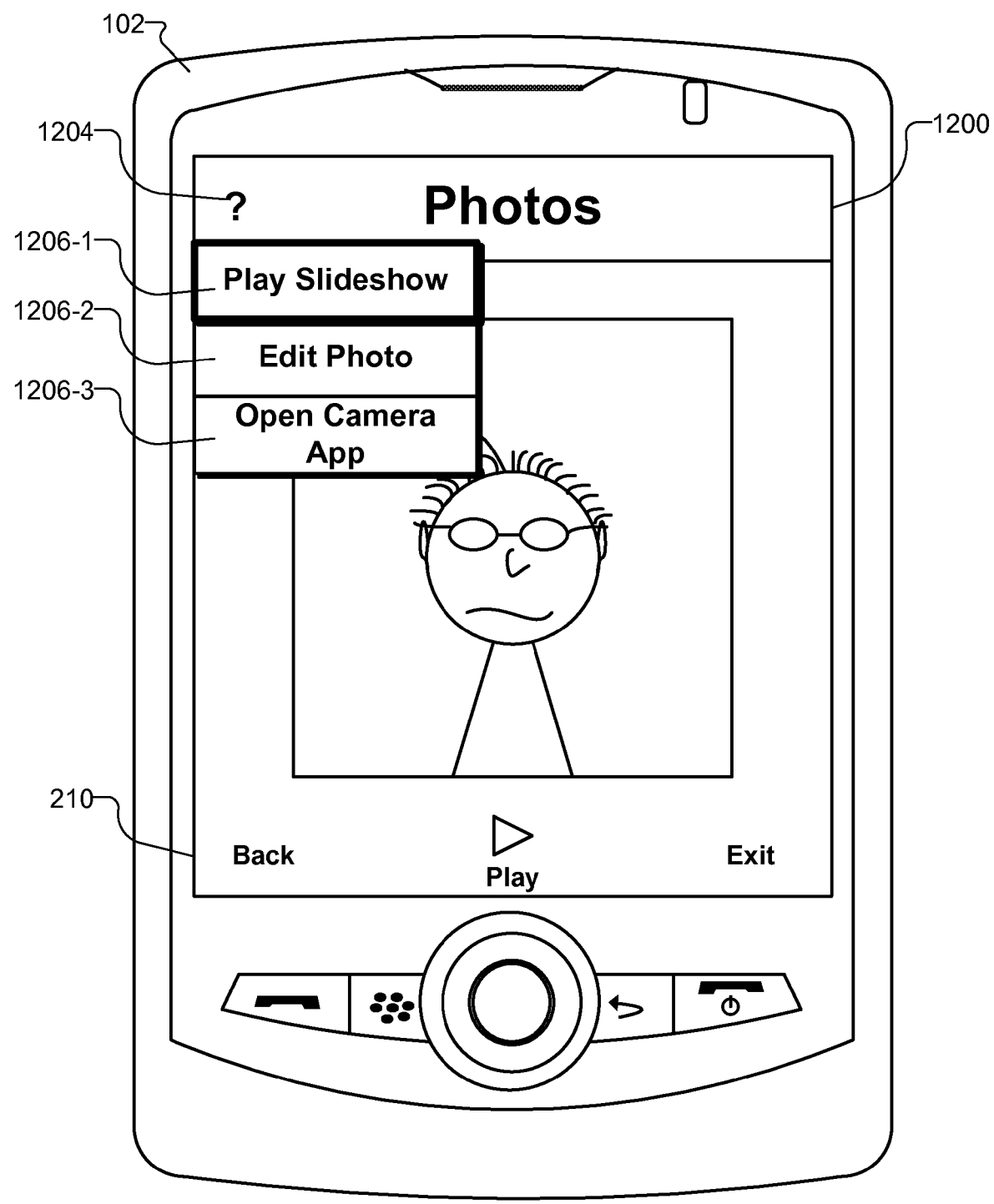
FIG. 12 illustrates an exemplary help GUI that may be displayed on a display screen of a mobile phone device according to principles described herein.

(e.g., how to input a control command). To this end, mobile phone device 102 may be configured to display an animation of one or more touch gestures used to perform one or more actions associated with mobile phone device 102 in response to a selection of a help option by a user. The animation may visually show the user how to perform the one or more touch gestures in order to accomplish a particular task. For example, FIG. 12 illustrates an exemplary GUI 1200 that may be displayed on display device 210 of mobile phone device 102 and that is configured to display a selectable help option 1204. As shown in FIG. 12, options 1206 (e.g., options 1206-1 through 1206-3) may be displayed in response to a user selection of help option 1204. A user may select one of options 1206 in order to view an animation of one or more touch gestures configured to perform the selected option 1206. For example, a user may select option 1206-1 in order to learn how to play a slideshow of photographs.

Figure 13:
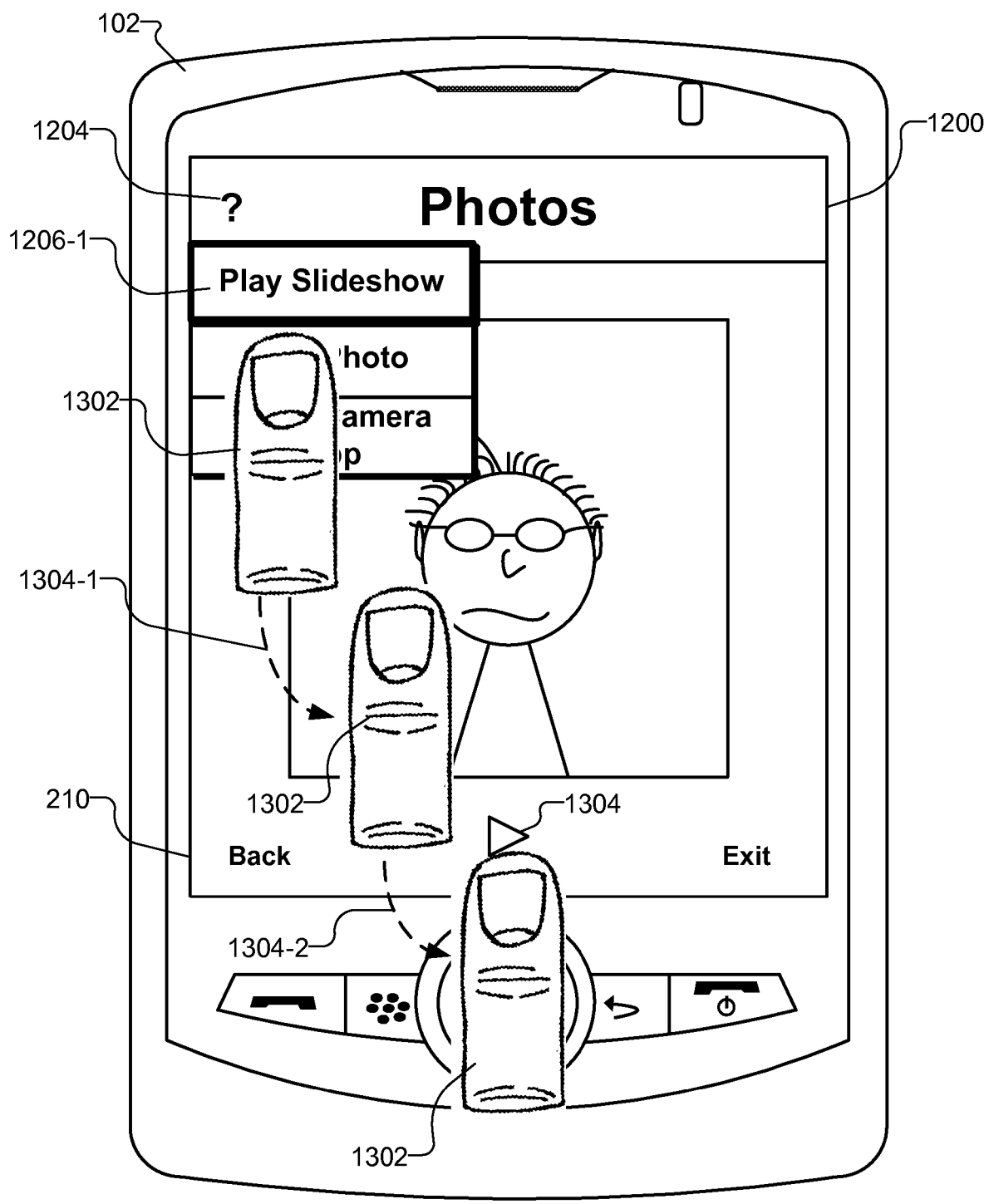
FIG. 13 illustrates a help animation that may be displayed on a display screen of a mobile phone device according to principles described herein.

FIG. 13 shows that, in response, mobile phone device 102 may be configured to display an animation of a finger 1302 that performs a touch gesture configured to play a slideshow of photographs. As illustrated by transition arrows 1304-1 and 1304-2, the animation may show that finger 1302 moves from the selectable help option 1204 down to a graphical object 1304 configured to play the slideshow when selected. In this manner, a user may visually see how to perform one or more actions associated with mobile phone device 102.

In some examples, mobile phone device 102 may be configured to control at least one operation of set-top box device 104 in accordance with a user profile associated with a user of mobile phone device 102. For example, user profile data 118 associated with a user of mobile phone device 102 may be transferred to set-top box device 104 and temporarily stored as user profile data 130. Set-top box device 104 may then operate in accordance with the user profile defined by user profile data 130. For example, set-top box device 104 may prevent the user from accessing one or more channels, present media content in accordance with a viewing preference of the user, and/or perform any other operation in accordance with the user profile associated with the user. When the wireless local area network communication channel between mobile phone device 102 and set-top box device 104 is closed, set-top box device 104 may revert back to a default mode of operation.

In some examples, one or more control commands may be input by a user by speaking the one or more control commands into a microphone or other receiver that is a part of mobile phone device 102. Voice recognition software implemented on mobile phone device 102 may recognize the one or more control commands spoken by the user and control set-top box device 104 accordingly.

Figure 14:
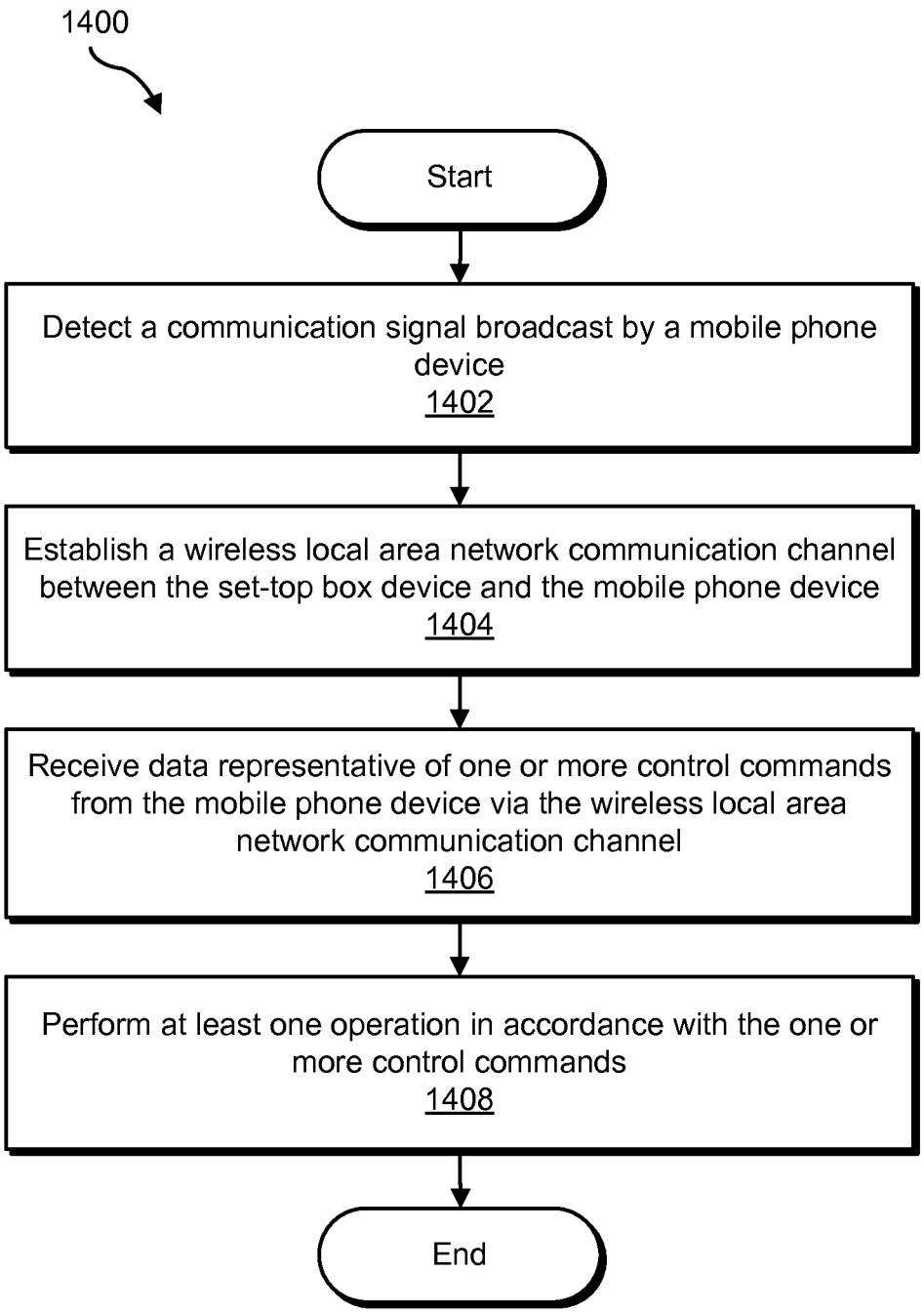
FIG. 14 illustrates another exemplary set-top box control method according to principles described herein.

FIG. 14 illustrates another exemplary set-top box control method 1400. While FIG. 14 illustrates exemplary steps according to one embodiment, other embodiments may omit, add to, reorder, and/or modify any of the steps shown in FIG. 14. The steps shown in FIG. 14 may be performed by set-top box device 104 and/or any of the facilities 120-126 associated with mobile phone device 102.

In step 1402, a communication signal broadcast by a mobile phone device is detected. The communication signal may be detected in any of the ways described herein.

In step 1404, a wireless local area network communication channel between the set-top box device and the mobile phone device is established. The wireless local area network communication channel may be established in any of the ways described herein.

In step 1406, data representative of one or more control commands is received from the mobile phone device via the wireless local area network communication channel. The data may be received in any of the ways described herein.

In step 1408, at least one operation is performed in accordance with the one or more control commands. The at least one operation may be performed in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   establishing, by a mobile phone device, a wireless local area network communication channel between the mobile phone device and a set-top box device by
   broadcasting from the mobile phone device a communication signal configured to
   direct the set-top box device to initiate the wireless local area network communication channel, the communication signal including a first key generated from a combination of a nonce value, a user ID assigned to the mobile phone device, and a password assigned to the mobile phone device, and
   recognizing an initiation of the wireless local area network communication channel by way of a router by the set-top box device, the initiation being performed by the set-top box device in response to detecting the communication signal broadcast from the mobile phone device by comparing the first key to a second key that is based on the nonce value, a user ID assigned to the set-top box device, and a password assigned to the set-top box device,
   transmitting, in response to the recognizing of the initiation of the wireless local area network communication channel, a handshaking request to the set-top box device to authenticate the wireless local area network communication channel,
   receiving a handshaking response from the set-top box device in response to the handshaking request, the handshaking response including a third key generated by the set-top box device and a second nonce value, and
   validating credentials of the set-top box device based on the handshaking response by determining that the third key was generated by the set-top box device using a valid user ID and password;
   providing, by the mobile phone device, a graphical user interface for display on a display screen of the mobile phone device, the graphical user interface configured to facilitate inputting of one or more control commands by a user of the mobile phone device; and
   controlling, by the mobile phone device, at least one operation of the set-top box device via the wireless local area network communication channel in accordance with the one or more control commands.

2. The method of claim 1, wherein the establishing of the wireless local area network communication channel by the mobile phone device further comprises:
   transmitting an acknowledgement of the validation to the set-top box device.

3. The method of claim 2, further comprising:
generating, by the mobile phone device, a fourth key based on the second nonce value included within the handshaking response; and
including the fourth key in the acknowledgement.

4. The method of claim 1, wherein the controlling comprises transmitting data representative of the one or more control commands to the set-top box device via the wireless local area network communication channel.

5. The method of claim 1, wherein the graphical user interface comprises a program guide graphical user interface that includes one or more media content listings representative of media content accessible via the set-top box device.

6. The method of claim 1, further comprising detecting, by the mobile phone device, one or more touch gestures performed by the user of the mobile phone device, the one or more touch gestures representative of the inputting of the one or more control commands.

7. The method of claim 6, wherein at least one of the one or more touch gestures is configured to direct the mobile phone device to cause a media content instance stored within the mobile phone device to be displayed on a display device associated with the set-top box device.

8. The method of claim 7, further comprising transmitting, by the mobile phone device, data representative of the media content instance to the set-top box device via the wireless local area network communication channel.

9. The method of claim 1, further comprising displaying, by the mobile phone device, an animation of one or more touch gestures in response to a selection of a help option by the user, the animation visually showing how to perform an action associated with the mobile phone device.

10. The method of claim 1, wherein the controlling is performed in accordance with a user profile associated with the user of the mobile phone device.

11. The method of claim 1, tangibly embodied as computer-executable instructions on at least one non-transitory computer-readable medium.

12. A method comprising:
detecting, by a set-top box device, a communication signal broadcast from a mobile phone device, the communication signal configured to direct the set-top box device to initiate a wireless local area network communication channel, the communication signal including a first key generated from a combination of a nonce value, a user ID assigned to the mobile phone device, and a password assigned to the mobile phone device;
establishing, by the set-top box device, the wireless local area network communication channel between the set-top box device and the mobile phone device by way of a router and in response to the detected communication signal broadcast from the mobile phone device by:
generating, in response to detecting the communication signal, a second key based on the nonce value, a user ID assigned to the set-top box device, and a password assigned to the set-top box device,
validating the communication signal by comparing the first key and the second key,
initiating the wireless local area network communication channel after the communication signal is validated,
receiving a handshaking request comprising the second nonce value from the mobile phone device after the wireless local area network communication channel is initiated,
generating a third key based on the second nonce value,
transmitting a handshaking response comprising the third key and a third nonce value to the mobile phone device,
receiving an acknowledgement signal from the mobile phone device, and
validating credentials of the mobile phone device based on the acknowledgement signal;
receiving, by the set-top box device, data representative of one or more control commands from the mobile phone device via the wireless local area network communication channel; and
performing, by the set-top box device, at least one operation in accordance with the one or more control commands.

13. The method of claim 12, wherein the acknowledgement signal comprises a fourth key based on the third nonce value and generated by the mobile phone device and wherein the validating of the credentials of the mobile phone device comprises determining that the fourth key was generated by the mobile phone device using a valid user id and password.

14. The method of claim 12, wherein the performing comprises directing a display device associated with the set-top box device to display a media content instance in accordance with the one or more control commands.

15. The method of claim 12, tangibly embodied as computer-executable instructions on at least one non-transitory computer-readable medium.

16. A system comprising:
a user interface facility that provides a graphical user interface for display on a display screen of a mobile phone device, the graphical user interface configured to facilitate inputting of one or more control commands by a user of the mobile phone device;
a communication facility communicatively coupled to the display facility and that establishes a wireless local area network communication channel between the mobile phone device and a set-top box device by
broadcasting a communication signal from the mobile phone device, the communication signal being configured to direct the set-top box device to initiate the wireless local area network communication channel, the communication signal including a first key generated from a combination of a nonce value, a user ID assigned to the mobile phone device, and a password assigned to the mobile phone device,
recognizing an initiation of the wireless local area network communication channel by way of a router by the set-top box device, the initiation being performed by the set-top box device in response to the set-top box device detecting the communication signal broadcast from the mobile phone device by comparing the first key to a second key that is based on the nonce value, a user ID assigned to the set-top box device, and a password assigned to the set-top box device,
transmitting, in response to the recognizing of the initiation of the wireless local area network communication channel, a handshaking request to the set-top box device to authenticate the wireless local area network communication channel,
receiving a handshaking response from the set-top box device in response to the handshaking request, the handshaking response including a third key generated by the set-top box device and a second nonce value, and
validating credentials of the set-top box device based on the handshaking response by determining that the third key was generated by the set-top box device using a valid user ID and password; and a control facility communicatively coupled to the communication facility and that controls at least one operation of the set-top box device via the wireless local area network communication channel and in accordance with the one or more control commands.

17. The system of claim 16, wherein the graphical user interface comprises a program guide graphical user interface that includes one or more media content listings representative of media content accessible via the set-top box device.

18. The system of claim 16, wherein the user interface facility is further configured to detect one or more touch gestures representative of the one or more control commands.

19. A system comprising:
a monitoring facility residing within a set-top box device and that detects a communication signal broadcast from a mobile phone device, the communication signal configured to direct the set-top box device to initiate a wireless local area network communication channel between the set-top box device and the mobile phone device, the communication signal including a first key generated from a combination of a nonce value, a user ID assigned to the mobile phone device, and a password assigned to the mobile phone device;
a communication facility communicatively coupled to the monitoring facility and that
establishes, by way of a router, a wireless local area network communication channel between the set-top box device and the mobile phone device in response to the detection of the communication signal broadcast from the mobile phone device by the monitoring facility by:
generating, in response to detecting the communication signal, a second key based on the nonce value, a user ID assigned to the set-top box device, and a password assigned to the set-top box device,
validating the communication signal by comparing the first key and the second key,
initiating the wireless local area network communication channel after the communication signal is validated,
receiving a handshaking request comprising the second nonce value from the mobile phone device after the wireless local area network communication channel is initiated,
generating a third key based on the second nonce value,
transmitting a handshaking response comprising the third key and a third nonce value to the mobile phone device,
receiving an acknowledgement signal from the mobile phone device, and
validating credentials of the mobile phone device based on the acknowledgement signal; and
receives data representative of one or more control commands from the mobile phone device via the wireless local area network communication channel; and
an operation facility residing within the set-top box that performs at least one operation in accordance with the one or more control commands.

20. A system comprising:
a mobile phone device; and
a set-top box device selectively and communicatively coupled to the mobile phone device;
wherein the mobile phone device is configured to
display a graphical user interface that is configured to facilitate inputting of one or more control commands by a user of the mobile phone device,
establish a wireless local area network communication channel with the set-top box device by
broadcasting from the mobile phone device a communication signal configured to direct the set-top box device to initiate the wireless local area network communication channel, the communication signal including a first key generated from a combination of a nonce value, a user ID assigned to the mobile phone device, and a password assigned to the mobile phone device,
recognizing an initiation of the wireless local area network communication channel by way of a router by the set-top box device, the initiation being performed by the set-top box device in response to the set-top box device detecting the communication signal broadcast from the mobile phone device by comparing the first key to a second key that is based on the nonce value, a user ID assigned to the set-top box device, and a password assigned to the set-top box device,
transmitting, in response to the recognizing of the initiation of the wireless local area network communication channel, a handshaking request to the set-top box device to authenticate the wireless local area network communication channel,
receiving a handshaking response from the set-top box device in response to the handshaking request, the handshaking response including a third key generated by the set-top box device and a second nonce value, and
validating credentials of the set-top box device based on the handshaking response by determining that the third key was generated by the set-top box device using a valid user ID and password; and
control at least one operation of the set-top box device via the wireless local area network communication channel and in accordance with the one or more control commands.

21. The system of claim 20, wherein the set-top box device is configured to:
receive, in response to the recognizing of the initiation of the wireless local area network communication channel, data representative of the one or more control commands via the wireless local area network communication channel; and
perform the at least one operation in accordance with the one or more control commands.

22. The system of claim 20, wherein the set-top box device is configured to operate in accordance with a user profile associated with a user of the mobile phone device.

* * * * *